US006956007B2

(12) United States Patent
Cai et al.

(10) Patent No.: US 6,956,007 B2
(45) Date of Patent: Oct. 18, 2005

(54) NOBLE METAL CATALYST

(75) Inventors: Mei Cai, Bloomfield Hills, MI (US); Lee Lizhong Feng, Troy, MI (US); Martin S. Ruthkosky, Sterling Heights, MI (US); Jerry Dale Rogers, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 143 days.

(21) Appl. No.: 10/647,403

(22) Filed: Aug. 25, 2003

(65) Prior Publication Data

US 2005/0049144 A1 Mar. 3, 2005

(51) Int. Cl.[7] ................................................ B01J 29/06

(52) U.S. Cl. ...................... 502/303; 502/304; 502/325; 502/332; 502/333; 502/339; 502/334; 502/349; 502/355

(58) Field of Search ................................ 502/303, 304, 502/325, 332, 333, 339, 334, 349, 355

(56) References Cited

U.S. PATENT DOCUMENTS 4,791,091 A * 12/1988 Bricker et al. .............. 502/303
4,915,987 A 4/1990 Nara et al.
5,064,803 A * 11/1991 Nunan ........................ 502/170
5,373,999 A 12/1994 Miyanami
6,045,764 A * 4/2000 Iizuka et al. ............. 423/213.5
6,391,276 B1 * 5/2002 Suda et al. ................. 423/598
6,680,279 B2 * 1/2004 Cai et al. .................... 502/327
2002/0131914 A1 * 9/2002 Sung .......................... 422/177
2002/0160912 A1 * 10/2002 Morikawa et al. .......... 502/303

* cited by examiner

*Primary Examiner*—Christina Johnson
(74) *Attorney, Agent, or Firm*—Kathryn A. Marra

(57) ABSTRACT

The present invention provides a method of making a noble metal catalyst, where the noble metal is distributed on the surface of special composite carrier particles. Nanometer sized oxide particles are first dry coated by an impact mixing process on the surface of larger alumina particles. In general, this dry coating process coats the nanometer sized particles on the surface of the alumina particles. A suitable solution of noble metal(s) compound is then soaked on the surface of the composite carrier particles. Ultimately, the noble metal compound is decomposed by calcining and noble metal particles dispersed with large effective surface area on the composite carrier particles. The resultant catalyst structure improves catalyst performance while making efficient and effective use of the expensive noble metal.

9 Claims, 1 Drawing Sheet

NOBLE METAL CATALYST

TECHNICAL FIELD

This invention relates generally to making composite alumina carrier particles for improved dispersion of noble metal(s) for a catalyst. More specifically, this invention relates to a method of coating the surfaces of suitably sized alumina particles with nanometer sized particles of an oxide by a dry impact process to make composite oxide carrier particles for dispersion of noble metal particles.

BACKGROUND OF THE INVENTION

Automotive vehicles presently use noble metal catalysts for the treatment of exhaust gases. Future vehicles may use such catalysts to process hydrocarbon fuels for fuel cell applications. But there remains a need for an improved dispersion of expensive noble metals on their carriers such as alumina carriers.

Vehicle exhaust systems use catalytic converters to treat unburned hydrocarbons (HC), carbon monoxide (CO) and various nitrogen oxides ($NO_x$) produced from the combustion of hydrocarbon fuels in the engine. A typical catalyst comprises one or more noble metals dispersed on high surface area alumina carrier particles. Often the alumina particles are mixed with particles of another oxide, such as ceria or lanthana, for oxygen storage during exhaust treatment.

The catalytic converter for exhaust gas treatment then comprises a washcoat of such noble metal catalyst coated on the walls of an extruded ceramic body in the shape of an oval honeycomb, generally referred to as a monolith. The monolith comprises several hundred small longitudinal channels per square inch of its cross-section for passage of the engine exhaust gases in contact with the catalyst. The noble metal catalyst, typically contains platinum, palladium and rhodium and is called a three way catalyst because under suitable engine operation, it effectively reduces $NO_x$ and oxidizes HC and CO at the same time.

In order to have a more efficient and effective use of the expensive noble metal catalyst, the noble metal must be effectively and safely dispersed on a catalyst carrier particle such that noble metal particle surfaces are exposed to the exhaust gas. Activated alumina particles with a large surface area per volume are commonly used as the catalyst carrier material. To enhance its catalyst carrier properties, the alumina particles are often mixed with small amounts of other metal oxides, such as cerium oxide or lanthanum oxide. Since the dispersion of the noble metal is heavily dependant on interactions with these metal oxides as carrier particles, proper distribution of the metal oxides on the surface of the alumina is necessary in order to have a high surface area of the noble metal catalyst. Even though these catalyst systems are used in millions of vehicles, there is no indication that the noble metal is dispersed as effectively as it might be.

In a typical current practice, an aqueous slurry of mixed alumina particles and ceria particles, both greater than one micron in diameter, is prepared with sufficient fluidity to coat the many small cells of the cordierite monolith structure. The coating is dried and calcined on the walls of the monolith cells. The catalyst carrier particles are then impregnated with one or more solutions of noble metal salts. The noble metal solution impregnated carrier particles are dried and the monolith again calcined to decompose the noble metal salts and leave dispersed noble metal particles on the surfaces of the mixed oxides. While this practice is widely used, it has now been discovered that the noble metal may be more effectively dispersed on alumina/ceria particles by a new practice.

Thus, it is an object of the present invention to provide a method of forming a catalyst structure that will better disperse the noble metal on the surface of a catalyst carrier to improve catalyst performance while making efficient use of the expensive noble metal.

SUMMARY OF THE INVENTION

The present invention provides a method of preparing a catalyst structure that has a high effective surface area of noble metal(s) particles dispersed on the surface of larger catalyst carrier particles. This catalyst structure is formed by first dry coating nanometer sized oxide particles on the surface of larger-sized alumina carrier particles to form composite carrier particles and then impregnating such carrier composite structure with a noble metal(s) solution. By way of example, micron plus sized particles of alumina are dry impact coated with nanometer sized ceria particles, lanthana particles, zirconium oxide particles, or the like, or even nano-sized particles of alumina. In a preferred embodiment, nanometer sized cerium oxide particles are dry coated on alumina particles to form the catalyst carrier composite structure for effective dispersion of the noble metal.

The method of dry coating includes mechanically mixing the nanometer sized oxide particles and the larger alumina particles under conditions upon which they impact each other with a force sufficient to cause the oxide particles to adhere to the surface of the larger catalyst carrier particles. This impact mixing practice is in contrast to the conventional stirring or ball milling of similar sized particles which does not coat small particles on large particles. The dry coating process, as denoted by its name, does not require the use of water or any other constituent to coat the metal oxides on the surface of the alumina. The dry coating process effectively breaks up clusters and agglomerates of the oxides and alumina and forms a carrier composite having well-dispersed oxides coated on the surface of the alumina particles.

After the dry coating process is complete, noble metal particles, selected, for example, from the group consisting of platinum, palladium, rhodium, or mixtures thereof, are impregnated on the surface of the carrier composite. The carrier composite is mixed with an aqueous noble metal solution (e.g., platinum solution) to produce a washcoat. The washcoat is then dried at a temperature sufficient to remove moisture. Generally, drying can be completed at room temperature for a period of about 2 hours. If any moisture remains after that period of time, further drying can be done at higher temperatures (about 110° C.) for a shorter period of time.

Once the moisture is removed, the newly dried washcoat is calcined at a temperature of about 300° C. to 500° C. to form a completed, catalyst structure. Since the dry coating method allowed uniform dispersion of the oxide on the surface of the alumina particles, the noble metal, which adheres to the surface of the oxide by impregnation, is uniformly dispersed as well. This yields a high effective surface area of the noble metal. The catalyst structure is, thus, effective and useful as a catalyst for use in noble metal catalyst applications.

It has been determined by CO adsorption analyses that noble metals dispersed on such dry mixed metal oxide/ alumina carriers present more noble metal surface area than catalysts with the same noble metal content prepared by prior art practices.

Other objects and advantages of this invention will become apparent from a detailed description of specific embodiments that follow.

DESCRIPTION OF THE PREFERRED EMBODIMENT

This invention focuses on the preparation of alumina carrier particles for a noble metal catalyst. The alumina is of a purity suitable for noble metal catalysts and used in the form of particles having a diameter of a few microns or larger. It is known that alumina particles can be prepared to have a relatively low surface area of, for example, 3 to 30 $m^2/g$ or in an activated form with a surface area of 100 $m^2/g$ or higher. Either form may be used in the practice of this invention as will be illustrated.

In accordance with this invention, nanometer sized (1 to 500 nm) particles of certain oxides useful in noble metal catalysts are coated on the surfaces of the alumina particles by a special high shear impact dry coating process. This process provides a noble metal catalyst carrier combination that lends itself to a large favorable dispersion of the noble metal on the surface of the catalyst carrier. The process can be used with any desired oxide but it is particularly applicable with oxides such as cerium oxide (i.e., ceria), lanthanum oxide (i.e., lanthana) and aluminum oxide (i.e. alumina). These oxides have been used in simple slurry mixtures with alumina in amounts up to 20 wt % of the mixture in automotive exhaust treatment catalysts. But in the practice of this invention, such nanometer sized metal oxide particles can be usefully coated on the surfaces of larger alumina particles for the purpose of later obtaining better dispersion of the noble metal.

A high shear impact dry mixing or coating process is used to coat the nanometer sized metal oxides onto the much larger alumina surfaces. In general, the coating process blends pre-measured portions of metal oxide particles and alumina particles and subjects them to high impact forces for a time suitable to coat and disperse the smaller metal oxides on the surface of the larger alumina. Two different commercially available machines have been found to accomplish this coating operation. One machine is the Hybridizer produced in various sizes by the Nara Machinery Company of Tokyo, Japan. A second mixing machine that is suitable is the Theta Composer produced by Tokuju Corporation, also of Tokyo, Japan.

Figure 2:
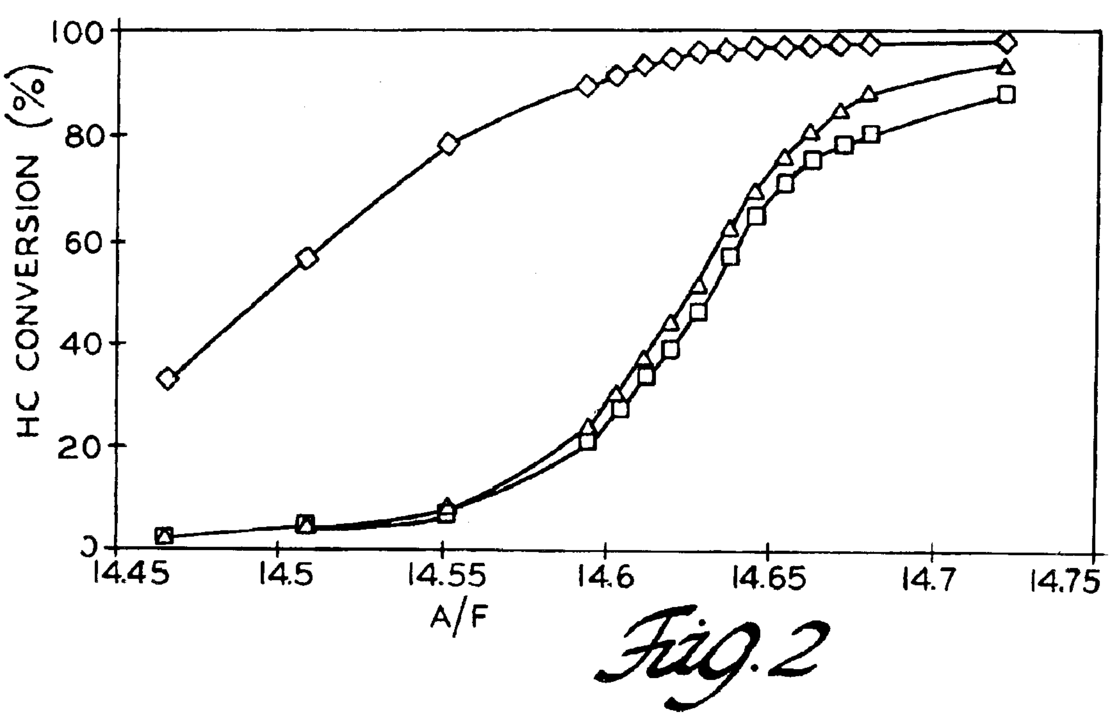
FIG. 2 is a graph of the percent conversion of HC at various exhaust mass air to fuel ratios, A/F, for a second Example 2 catalyst of this invention (Sample 2B), a comparative commercial sample and a sample prepared by a conventional method (Sample 2D). The data was obtained using catalyst coated monoliths as exhaust reactors and synthetic exhaust gas mixtures for the sweep test over the A/F range.

The Hybridizer mixing machine that can be used in the examples described below is described in U.S. Pat. No. 4,915,987. FIGS. 2–4 of the '987 patent illustrate the operation of this mixing device and, accordingly, the disclosure of that patent is hereby incorporated by reference. In summary, as shown in FIG. 2 of the '987 patent, the mixer comprises a vertically oriented, rotateable circular plate supported in a mixing chamber. The plate has several radially aligned impact pins attached to its perimeter and can be driven at a range of speeds up to 15,000 rpm. The plate rotates within a collision ring having an irregular or uneven surface facing the impact pins.

In the practice of this invention, a powder comprising premixed alumina with nanometer sized metal oxides are fed into a hopper leading to the powder inlet at the rotational axis of the machine. Air or other suitable atmosphere is used during the mixing. The incoming powder mixture is carried in the air stream by centrifugal force to the edge of the rotor plate. The powder particles receive a momentary strike by many pins or blades on the rotor and are thrown against the collision ring. The airflow generated by the fan effect of the rotating plate and pins causes repeated impacts between the catalyst particles and carrier particles and the collision ring. The design of the Hybridizer machine permits selective withdrawal of the mixed powder along with recycling of some powder and continuation of the mixing.

Dry coating in accordance with this invention has also been accomplished using the Theta Composer. The operation of this machine is illustrated in U.S. Pat. No. 5,373,999 and the disclosure of that patent is hereby incorporated by reference.

Figure 1:
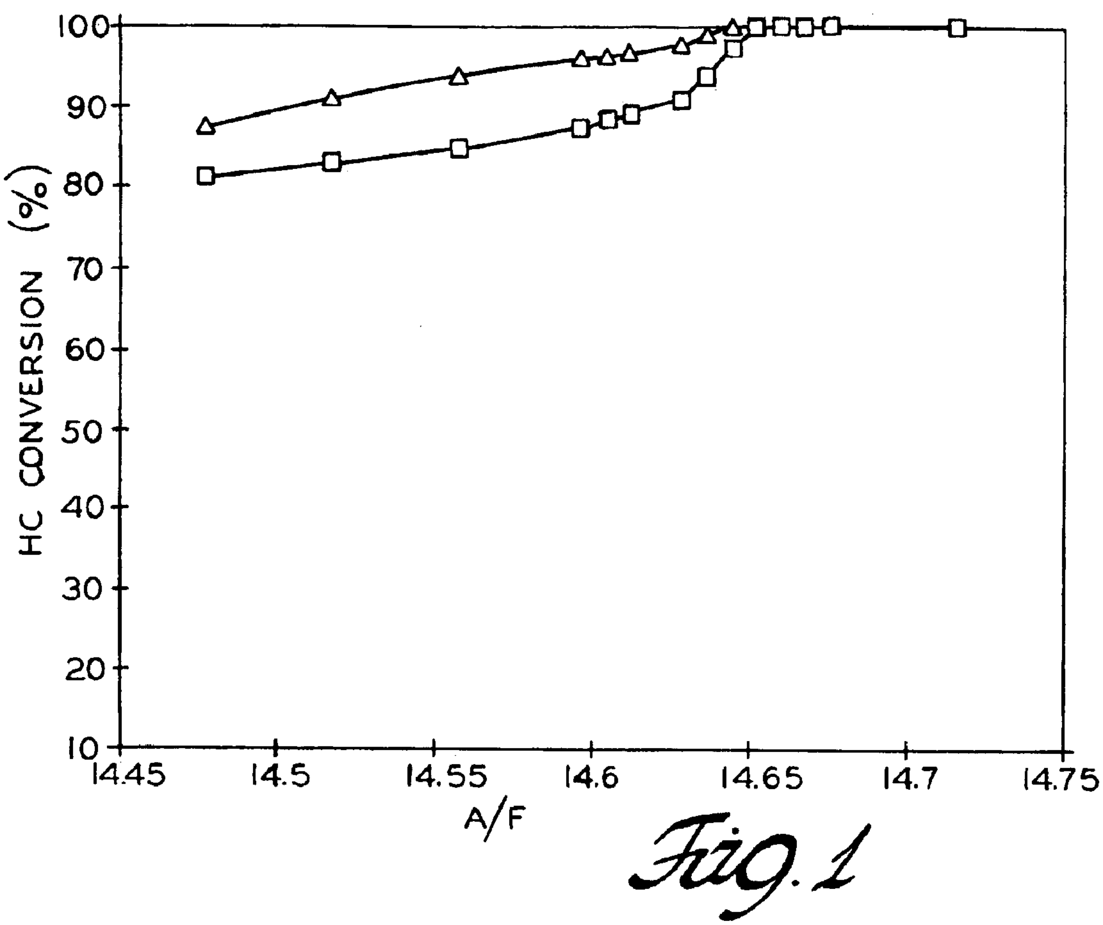
FIG. 1 is a graph of percent conversion (i.e., oxidation to water and $CO_2$) of hydrocarbons, HC, at various exhaust mass air to fuel ratios, A/F, for the Example 2 catalyst (Sample 2A) of this invention and for a comparative conventional catalyst sample (Sample 2C). The data was obtained using catalyst coated monoliths as exhaust reactors and synthetic exhaust gas mixtures for the sweep test over the A/F range.

As seen in FIGS. 1, 2, 3(*a*), and 3(*b*) of the '999 patent, the Theta Composer comprises a horizontally disposed, rotary cylindrical tank with an oval cross section mixing chamber. Supported within the oval mixing chamber is a smaller oval mixing blade that is rotatable separately from the tank in the same or opposite direction. The long axis of the mixing blade is slightly smaller than the short axis of the oval chamber to affect a gathering and compression of particles caught between them in the operation of the machine. The outer vessel rotates relatively slowly to blend the particles while the inner rotor rotates at a relatively high speed. The alumina particles and nanometer sized oxide particles drop freely by gravitation in the moving large volume swept by the mixing blade and fluidize along the inner wall of the mixing chamber. Particles that are wedged in the moving narrow clearance between the inner wall of the oval cross-section and the mixing blade are suddenly subjected to strong shearing forces. Essentially, the nanometer sized oxide particles are dry coated on the larger alumina particles by continually shearing a mixture of said metal oxide and larger alumina particles between two rotating surfaces. This action is found to coat and embed the catalyst particles on the surface of the carrier particles to form a catalyst composite structure.

The nanometer sized oxide particles are, thus, dry-coated on the surfaces of the larger alumina particles to form this small-particle-on-large-particle carrier composite. The noble metal(s) is then dispersed on this unique carrier composite by impregnation with a solution(s) of one or more noble metals.

The noble metal used can be selected, for example, from the group consisting of platinum, palladium and rhodium. In a preferred embodiment, for example, a suitable platinum salt is dissolved in deionized water. A volume of the solution containing a known quantity of noble metal is mixed with and soaked into a known quantity of the composite carrier mixture. After complete mixing, the noble metal salt soaked carrier is then dried in room conditions for about 2 hours and then further dried at elevated temperature (about 110° C.) to remove any remaining moisture. The dry material is then calcined in air at 300 to 500° C. for another hour to decompose the noble metal salts and yield dispersed particles of noble metal on the oxide particle/alumina particle carrier. As will be demonstrated below, such dispersion of noble metal particles on the unique composite carrier yields a higher effective surface area of a given weight or amount of noble metal.

The practice of the present invention will now by illustrated with some specific examples.

EXAMPLE 1

Dry-Coated Sample

Cerium oxide particles having a particle size (diameter) in the range of about 9 to 15 nm (average 10 nm) were obtained. Twenty parts by weight of the ceria particles were mixed with eighty parts by weight of micron sized alumina particles. The alumina particles had a surface area of 100 $m^2/g$ or more.

The crude mixture was introduced into the processing chamber of a bench scale Theta Composer. The total amount of the mixture introduced was 20–30 grams. Samples of this size occupied 60–70% of the process chamber volume and minimized powder agglomeration in the chamber during processing. The dry mixture was processed in the Theta Composer for a total of 30 minutes with an outer rotation speed of 75 rpm and an impeller speed of 2,500 rpm. A sample of the mixture was examined microscopically and was observed that the mixture was characterized by alumina particles coated with much smaller ceria particles. No abundance of individual ceria particles or alumina particles was observed in the mixture.

The ceria particle on alumina particle carrier composite was subsequently impregnated with a platinum salt solution. The solution comprised a $(NH_3)_4Pt(NO_3)_2$ salt in sufficient quantity to apply Pt to the quantity of carrier composite in an amount of 0.75% Pt by weight. After the solution was thoroughly mixed with the carrier particles, the sample was then dried for 2 hours at 125° C. to remove the water. The sample was initially calcined in air for 1 hour at 400° C. to decompose the ammonium platinous nitrate salt. Thus, a potential noble metal catalyst was prepared comprising a dispersion of fine particles of platinum on the ceria-on-alumina carrier. The catalyst was then examined to determine the nature of the dispersion of the noble metal on the carrier.

It is known that noble metals will adsorb carbon monoxide (CO) molecules and that ceria and alumina do not adsorb this gas. Accordingly, the catalyst sample was exposed to a known volume of CO gas. It was found that 32% of the noble metal presented a surface for CO adsorption.

Comparison Sample

For use as a comparison sample, an simple stirred mixture of the same ceria and alumina particles in the same quantities was treated with the same platinum salt solution ($(NH_3)_4Pt(NO_3)_2$) at 0.75% Pt by weight. In this catalyst, the ceria particles were not coated on the alumina particles, they were simply intermixed with the alumina particles. The noble metal solution was soaked into this kind of mixture. The sample was dried for 2 hours at 125° C. to remove the water and calcined in air for 1 hour at 400° C.

Again a known volume of CO was introduced into the sample. By measuring the volume of CO adsorbed, the active metal surface area, or metal dispersion, of the catalyst was determined. In this example, only 20% of the noble metal presented surfaces for adsorption of the CO.

Thus, the noble metal catalyst prepared with the ceria-on-alumina particle carrier provided 60% more effective noble metal surface.

EXAMPLE 2

Dry-Coated Sample

High surface area alumina particles were coated on a lower surface area alumina using the dry coating process to form a first dry coated sample. The high surface area alumina had a surface area of 300 $m^2/g$ and mean particle diameter of 300 nm. The lower surface area alumina had a surface area of 80 $m^2/g$ and a mean particle diameter of 3 microns.

The high surface area alumina was initially mixed at 10% by weight with the low surface area alumina and then introduced into the processing chamber of a laboratory Theta Composer. The total amount of the mixture introduced was 20–30 grams. Samples of this size occupied 60–70% of the process chamber volume and minimized powder agglomeration in the chamber during processing. The dry mixture was processed in the Theta Composer for a total of 30 minutes with an outer rotation speed of 75 rpm and an impeller speed of 2,500 rpm.

The mixture obtained from the dry mixing process was characterized as substantially the micron sized alumina particles coated with the smaller quantity by weight of nanometer sized alumina particles. There was no abundance of individual micron sized alumina particles or nanometer sized alumina particles in the mix.

The resulting processed alumina mixture was mixed with water to form a slurry or washcoat. This washcoat was applied to the cell walls of a ceramic monolith support structure with a cell density of 600 cpsi (cells per square inch). The wash coated monolith was initially dried at 125° C. for 2 hours to remove the water and then calcined for 1 hour at 600° C.

The platinum component was applied to the coated monolith as a platinum salt solution of $(NH_3)_4Pt(NO_3)_2$ diluted in deionized water. The concentration of the solution was calculated based on a water pickup test prior to the impregnation. The amount (by weight) of water drawn into the monolith was used to accurately determine the amount of platinum metal that would be coated on the sample. After application of the platinum salt the samples were allowed to air-dry for 40 minutes and then dried in an oven at 125° C. for 3 hours. The dried sample was then calcined at 400° C. for 1 hour to decompose the platinum from a salt to the metallic (Pt) form. The total platinum metal loading on the nanosized alumina particle on micron sized alumina carrier particle washcoat was 28 $g/ft^3$. This was Sample 2A.

A second dry coated sample (Sample 2B) was prepared in the same way as the first dry coated sample. In this sample, the carrier composite was coated with a Pt noble metal using a Pt loading of 25–27 $g/ft^3$ Pt on alumina using a monolith structure with 0.75 inches in diameter and 2 inches in length.

Comparison Sample

For comparison with the first dry coated sample, a first simulated commercial sample (Sample 2C) was tested. That sample had been prepared utilizing simply mixed, micron sized, high surface area, alumina-based slurries (washcoats) that are drawn through the cells of the monolith structure under vacuum to obtain a thin uniform coating of the cell walls. After drying and calcination of the washcoat, the noble metal was applied as an aqueous salt solution and calcined a second time.

This commercial sample (2C) consisted of 2 segments. The front segment comprised ⅓ of the total volume and contained Pd (79 g/ft$^3$) dispersed on the alumina washcoat. The second segment made up the remaining volume and contained platinum and rhodium (total of 23 g/ft$^3$) dispersed on the washcoat particles.

A second simulated commercial sample (Sample 2D) was also prepared and was used for comparison with the second dry coated sample (2B). In this simulated commercial sample (2D), the same Pt loading as the second dry coated sample (2B), i.e., 25–27 g/ft$^3$ Pt on alumina was used on a monolith structure which was 0.75 inches in diameter and 2 inches in length.

Results

The catalytic activities of the dry-coated and the comparison samples were tested by a lab-scale reactor that simulated automotive exhaust conditions. Current gasoline fueled automotive engines are operated by continually cycling the air to fuel mass ratio (A/F) from a fuel rich to a fuel lean condition and back. For example, the fuel rich limit may be an A/F of 14.477 and a fuel lean limit may be an A/F of 14.62. As the engine A/F ratio changes, the composition of the exhaust gas entering the exhaust catalytic converter changes as illustrated in the following table. The tests of the subject noble metal catalyst and the commercial exhaust catalyst were conducted at steady state at a reactor catalyst bed temperature of 500° C. and an exhaust gas (simulated compositions) space velocity of 35,000 h$^{-1}$. The exhaust gas compositions were periodically changed, after steady state data had been accumulated, to simulate the range of exhaust compositions experienced by the catalysts. This kind of testing is known as a "sweep test." The reactor inlet exhaust gas compositions are shown in the following table.

tests is attributed to the ability of the nanosized alumina on micron sized alumina particles to disperse its platinum content.

The reactor test was also used for the second dry coated (Sample 2B) and second simulated commercial samples (Sample 2D) but where the reactor temperature was maintained at 350° C. FIG. 2 provides the percent conversion of HC at a range of air to fuel mass (A/F) ratios. Using the same type of "sweep test" as that used for Example 2, isotherms were generated for the dry coated sample 2B, the simulated commercial comparison sample (2D) and a commercial sample from Johnson-Mathey (JM) with the same platinum loading.

The hydrocarbon conversion data for the three samples in the A/F sweep tests are presented graphically in FIG. 2. The percentage hydrocarbon conversion data for the dry coated sample (2B) is plotted with the diamond data points. The HC conversion for the simulated conventional sample (2D) is plotted as the square data points, and the data for the JM sample is plotted as the triangular data points. As shown in FIG. 2, the hydrocarbon (HC) conversion of the dry-coated sample (2B) was overall better than the commercial samples tested at all ranges of the A/F ratios tested. Moreover, at lower to mid A/F ratios, the dry coated method proves to be much better at converting HC than the other two comparative samples.

EXAMPLE 3

Dry-Coated Sample

In this example, monolithic catalysts were made of ceramic honeycomb substrate (cordierite) and 1% by weight platinum on alumina-ceria-zirconia used as a catalytic washcoat carrier. Cordierite substrates (Corning) were used in cylindrical sample sizes of 0.75 inch diameter and 1.5 to 2 inches in length.

| A/F | $O_2$ % | CO % | $H_2$ % | HC ppm | NO ppm | $CO_2$ % | $H_2O$ % | $SO_2$ ppm | $N_2$ % |
|---|---|---|---|---|---|---|---|---|---|
| 14.477 | 0.404 | 0.696 | 0.232 | 413.5 | 930.3 | 10.0 | 10.0 | 2.0 | Balance |
| 14.517 | 0.417 | 0.647 | 0.216 | 395.4 | 932.2 | 10.0 | 10.0 | 2.0 | Balance |
| 14.557 | 0.432 | 0.601 | 0.2 | 377.5 | 933.2 | 10.0 | 10.0 | 2.0 | Balance |
| 14.597 | 0.448 | 0.558 | 0.186 | 359.9 | 933.1 | 10.0 | 10.0 | 2.0 | Balance |
| 14.605 | 0.452 | 0.55 | 0.183 | 356.4 | 933 | 10.0 | 10.0 | 2.0 | Balance |
| 14.612 | 0.455 | 0.542 | 0.181 | 352.9 | 932.9 | 10.0 | 10.0 | 2.0 | Balance |
| 14.62 | 0.459 | 0.534 | 0.178 | 349.5 | 932.7 | 10.0 | 10.0 | 2.0 | Balance |
| 14.628 | 0.462 | 0.526 | 0.175 | 346 | 932.4 | 10.0 | 10.0 | 2.0 | Balance |
| 14.636 | 0.466 | 0.518 | 0.173 | 342.6 | 932.2 | 10.0 | 10.0 | 2.0 | Balance |
| 14.644 | 0.47 | 0.51 | 0.17 | 339.2 | 931.8 | 10.0 | 10.0 | 2.0 | Balance |
| 14.652 | 0.474 | 0.503 | 0.168 | 335.7 | 931.5 | 10.0 | 10.0 | 2.0 | Balance |
| 14.66 | 0.478 | 0.495 | 0.165 | 332.3 | 931.1 | 10.0 | 10.0 | 2.0 | Balance |
| 14.668 | 0.482 | 0.488 | 0.163 | 329 | 930.7 | 10.0 | 10.0 | 2.0 | Balance |
| 14.676 | 0.486 | 0.48 | 0.16 | 325.6 | 930.2 | 10.0 | 10.0 | 2.0 | Balance |
| 14.715 | 0.5 | 0.445 | 0.14 | 309 | 927.3 | 10.0 | 10.0 | 2.0 | Balance |

FIG. 1 summarizes the conversion data for the catalyst samples 2A and 2C. The data is presented as graphs of HC conversions for the two catalyst samples at the several A/F values. The data for Sample 2A is the triangular data point plot and the data for Sample 2C is the square data point plot. The simulated conventional sample 2C was tested at 525° C. as generally specified for this formulation and at the same space velocity as for testing of Sample 2A. Also, the conventional catalyst (Sample 2C) contained three noble metals while the catalyst example of this invention (Sample 2A) contained only platinum.

The hydrocarbon conversion for the subject noble metal catalyst (Sample 2A, triangular data points) is higher at the challenging lower A/F (fuel rich) conditions. The impressive performance of the subject catalyst (Sample 2A) in these Zirconium oxide and cerium oxide particles were coated on larger alumina particles to form a carrier composite structure. Prior to dry coating, the alumina particles (Condea Corporation) were prepared by drying an aqueous solution of alumina at a temperature of 150° C. for 2 hours and then at 250° C. for an additional hour to remove any remaining moisture from the alumina. The alumina particles were thermally treated for another 2 hours at a much higher temperature of 700° C. Then the alumina particles were allowed to cool at room temperature and were ready for mixing with other smaller oxide particles to form the carrier composite structure.

The mixture was to comprise 80 wt % of alumina, 15 wt % zirconium oxide and 5 wt % cerium oxide particles. The alumina particles for the mixture had a particle diameter of 2–20 microns and a BET surface area of 100–150 $m^2/g$. The zirconium oxide particles (Di-ichi) had particle diameters of 0.2 (200 nm)–10 microns with a surface area of 80–120 $m^2/g$. The cerium oxide (Nanophase) particles had a particle diameter of 9–15 nm and a surface area of 55–95 $m^2/g$.

The alumina was dry coated with the zirconium oxide and cerium oxide particles by adding the mixture to the processing chamber of the laboratory Theta Composer. Mixing took place for 2 minutes by rotating the outer chamber at 75 rpm. Then the zirconium oxide and cerium oxide particles were dry coated on the surface of alumina under high impact and shearing forces for 45 minutes where the outer chamber was rotated at a speed of 2500 rpm to form a dry coated powder.

The dry coated powder was then mixed with water (approximately 30–40 wt %) to form a slurry or washcoat. Preweighed, uncoated monolith core blanks were dipped into the washcoat. The slurry was wicked into the cell structure from both ends of the cores. After the longitudinal cells were filled with the slurry, excess washcoat was removed by shaking and blowing compressed air through the core structure. Then the washcoat was dried at room temperature for 30 minutes before being placed in an oven at 120° C. to complete the drying. Calcination was thereafter completed at a temperature of 600° C. for 1 hour to attach the washcoat to the cell walls. The processed cores were reweighed to determine the washcoat weights. Thus, the cell walls of the cordierite monolith samples were provided with a washcoat of composite carrier particles prepared in accordance with this invention.

Platinum metal was coated on the composite carrier particle coated cell walls by impregnation of the washcoat with a platinum salt solution. The concentration and amount of the salt solution was determined based on a predetermined value of the solution uptake and the final metal loading desired. The monolith was covered with a wax film (Parafilm) and dipped into this platinum salt solution so that the solution entered and soaked into the composite particles. Solution uptake was determined by weighing. The coated cores were allowed to dry for 30 minutes at room temperature and then placed in an oven at 120° C. for a minimum for 2 hours to remove any remaining moisture. Calcination was then performed at 400° C. to convert the salt into its metallic form.

Aging Test

An aging test was conducted on the dry-coated sample as a simulation of vehicle durability test for catalysts used under automotive duty cycle at high temperatures of 700 to 1000° C. In this instance a simulation of aging was conducted so that the catalyst could be characterized by CO chemisorption after the aging.

In the aging test, a washcoated and platinum impregnated cordierite sample was mounted into a cylindrical quartz tube, which was placed inside a tube furnace, and was heated at a set temperature with a steady stream of gas mixture flowing through the catalyst along the channels of the catalyst support monolithic structure. The gas mixture was, by volume, 2% $H_2$, 6% CO, 6% $CO_2$, 30% $H_2O$ and 56% $N_2$. The total gas flow rate in the aging test was between 70–150 standard liters per minute at ambient pressure. An aging test temperature of 700° C. was used for a time period of 2 hours. Thus, the catalyst is exposed to a simulated exhaust gas at a temperature representative of automotive exhaust conditions.

Chemisorption was conducted after the aging test, where CO was used as an adsorbate gas to chemically adsorb to the catalytically active platinum (PGM) sites. The amount of CO uptake was considered an indicator of the number of active catalyst sites because it is directly related to the conversion efficiency of the catalyst. The aged sample was initially heated at 10° C./min. to 350° C. for 20 minutes in a helium atmosphere to remove the water. The sample was then cooled and heated to 20° C./min. to 350° C. for 90 minutes under a hydrogen atmosphere to reduce the active metal particles incorporated on the monolith washcoat. After cooling to 35° C., CO gas was introduced in small, incremental doses and monitored using pressure sensors. The series of doses of adsorbent CO gas was plotted to give an adsorption isotherm. Following the adsorption isotherm, the sample was placed under vacuum and a second adsorption isotherm was generated. A third isotherm, calculated from the difference between the two measured isotherms, provided the amount of CO gas chemically bound to the active sites on the sample and thus, a measurement of the catalyst efficiency. A result of active Pt metal of 5.8 micro-mol/g of catalyst, based on the assumed adsorption of 1 molecule of CO per available surface atom of Pt, was obtained for the dry coated sample.

Comparison Sample

The sample used for comparison was bought from ASEC and is commercially prepared using the same Pt loading and geometric size. The aging and chemisorption tests, same as that used for the dry-coated sample, were used to determine the amount of catalyst yield. These tests showed how the commercial sample gave a yield of active Pt metal of 4.7 micro-mol/g.

This comparison demonstrated that the aged dry coated sample retained a higher yield of Pt metal than the commercially obtained sample.

It is seen that the subject method of coating micron sized, or larger, alumina particles with nanometer sized particles of a metal oxide provides an excellent composite carrier for the effective dispersion of noble metal(s) for a noble metal catalyst. Preferably, the metal oxide is one or more of nanometer sized alumina particles, ceria particles, lanthana particles or zirconia particles.

While this invention has been described through the above examples, it is not intended to be limited to the above embodiments.

What is claimed is:

1. A method of preparing a catalyst comprising particles of noble metal dispersed on micron sized or larger alumina particles, said method comprising:

dry coating nanometer sized metal oxide particles on the surface of said alumina particles to form composite carrier particles for said noble metal;

dispersing particles of a noble metal on the surface of said composite carrier particles by mixing a solution of noble metal compound with said composite carrier particles to produce a mixture;

evaporating the solvent for said solution from said mixture; and calcining the mixture to decompose said noble metal compound and disperse noble metal particles on said composite carrier particles.

2. A method as recited in claim 1 in which the solution of noble metal compound is an aqueous solution of a salt of said compound and said noble metal is one or more noble metals selected from the group consisting of platinum, palladium and rhodium.

3. A method as recited in claim 1 wherein said dry coating step comprises repeatedly propelling a mixture of said oxides and alumina particles against an impact surface at a high velocity.

4. A method as recited in claim 1 wherein said dry coating step comprises continually shearing a mixture of said oxides and alumina particles between two rotating surfaces.

5. The method as recited in claim 1 in which said metal oxide is selected from the group consisting of cerium oxide, lanthanum oxide, zirconium oxide, aluminum oxide and mixtures thereof.

6. The method as recited in claim 1 in which said metal oxide is aluminum oxide.

7. A method of preparing a catalyst comprising particles of noble metal dispersed on micron sized or larger alumina particles, said method comprising:

dry coating nanometer sized metal oxide particles on the surface of larger alumina particles such that said metal oxide particles adhere to the surface of said alumina to form composite carrier particles, said metal oxide particles being of a metal oxide selected from the group consisting of cerium oxide, lanthanum oxide, zirconium oxide, aluminum oxide, and mixtures thereof;

soaking said composite carrier particles with an aqueous solution of a compound of a noble metal selected from the group consisting of platinum, palladium, rhodium and mixtures thereof;

drying said soaked particles; and calcining the dried particles to decompose said noble metal compound and disperse noble metal particles on said composite carrier particles.

8. A method as recited in claim 7 wherein said dry coating step comprises repeatedly propelling a mixture of said oxide and alumina particles against an impact surface at a high velocity.

9. A method as recited in claim 7 wherein said dry coating step comprises continually shearing a mixture of said oxide and alumina particles between two rotating surfaces.

* * * * *